July 13, 1965 C. W. FREY ETAL 3,194,281
METHOD AND TOOL FOR LOCKING STRAPPING BAND ENDS TOGETHER
Filed Dec. 18, 1962 7 Sheets-Sheet 1
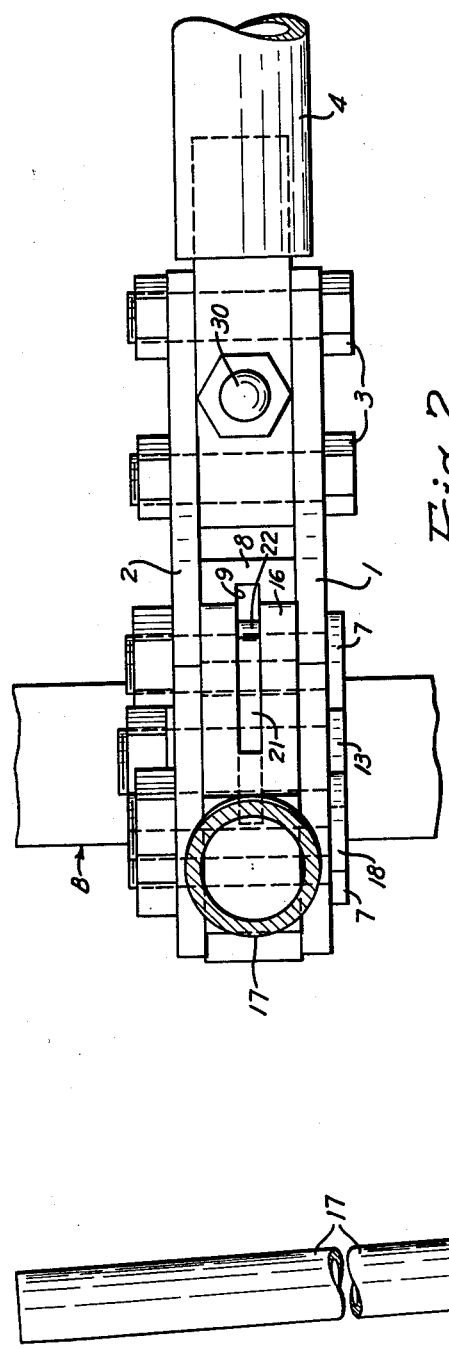
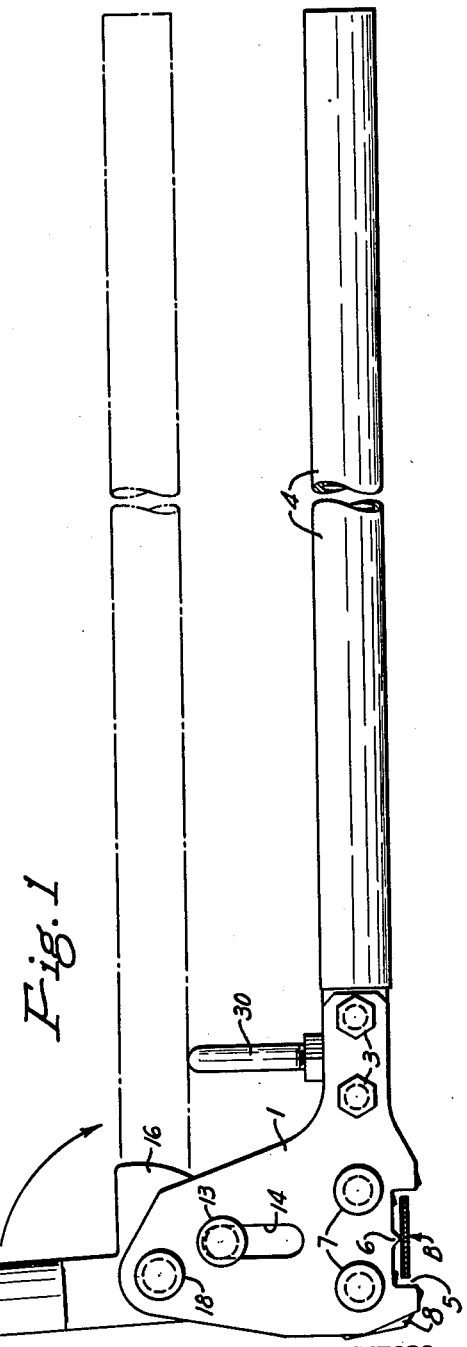
INVENTORS.
CHARLES W. FREY
GEORGE A. ZERBY
BY
Brown, Critchlow, Flick & Peckham
ATTORNEYS.

July 13, 1965     C. W. FREY ETAL     3,194,281
METHOD AND TOOL FOR LOCKING STRAPPING BAND ENDS TOGETHER
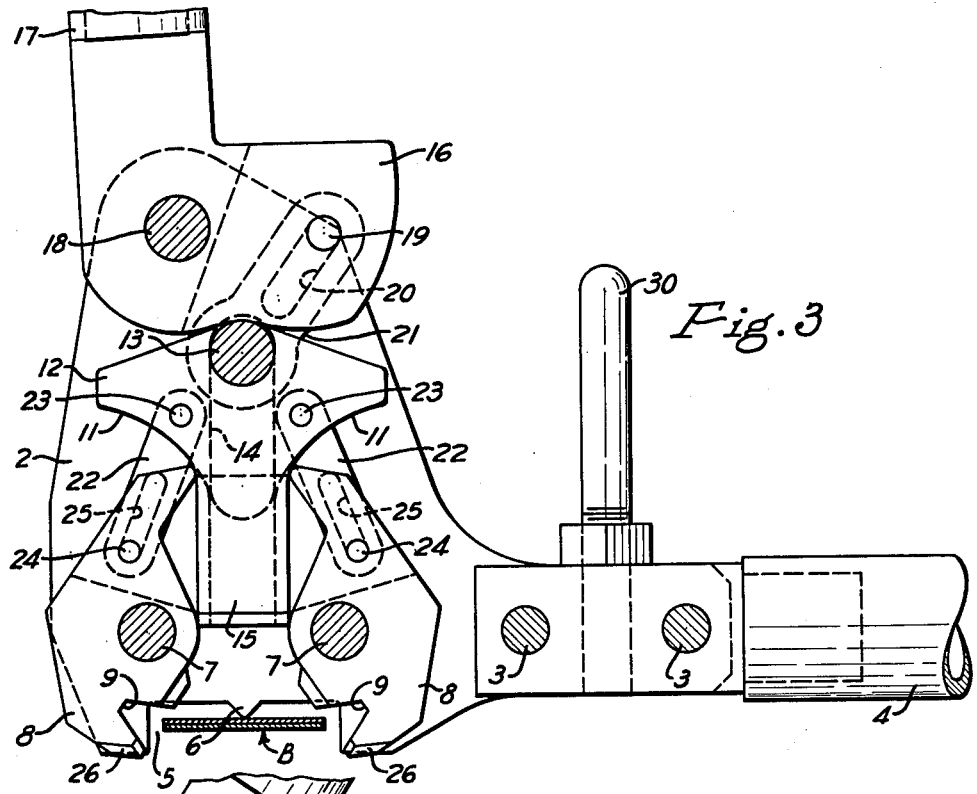
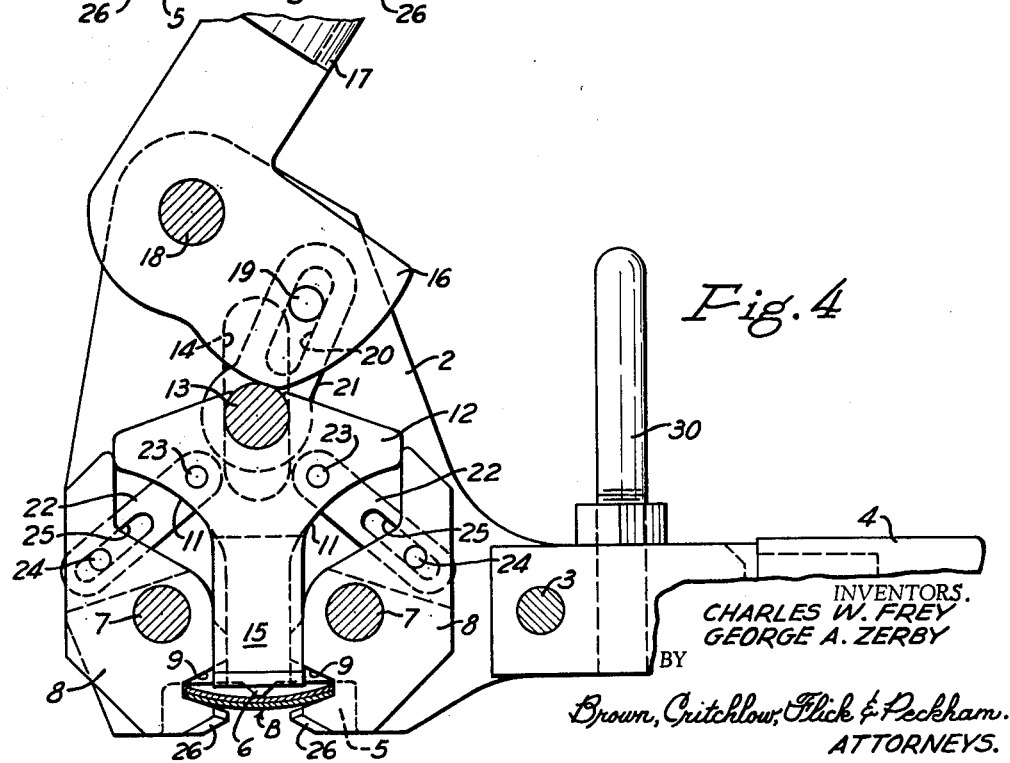
INVENTORS.
CHARLES W. FREY
GEORGE A. ZERBY

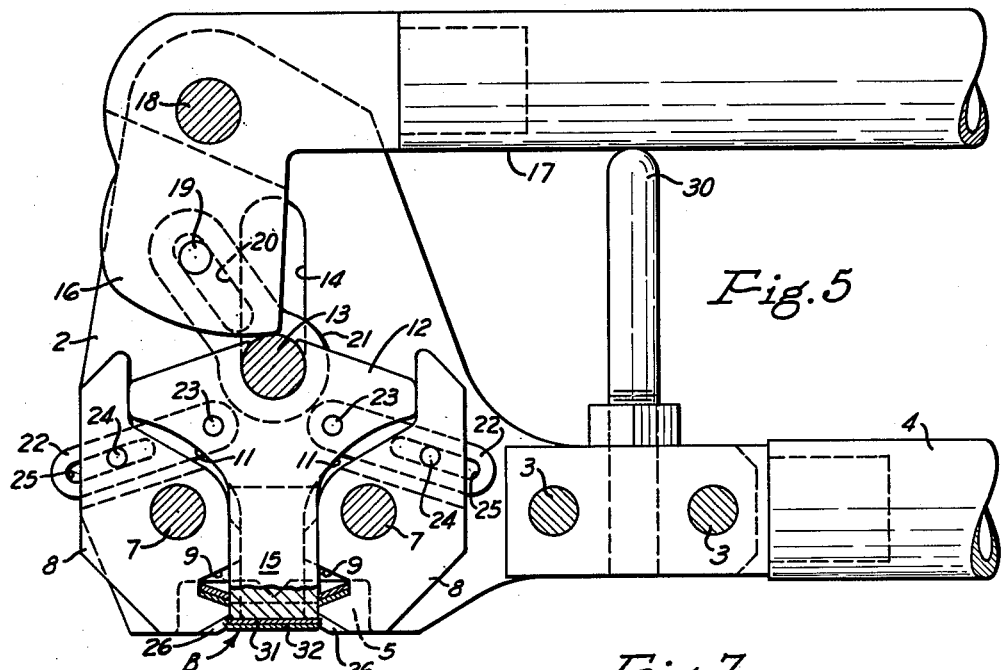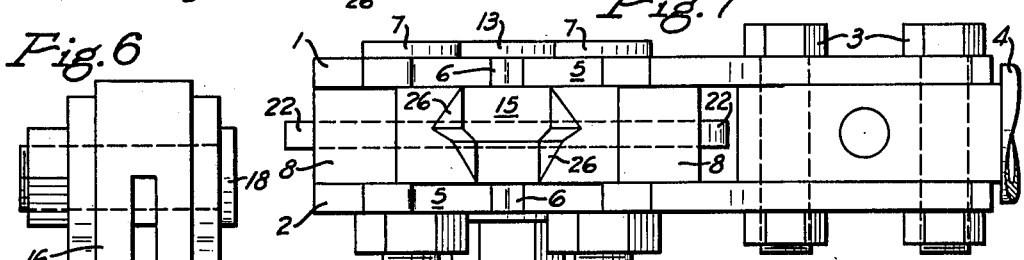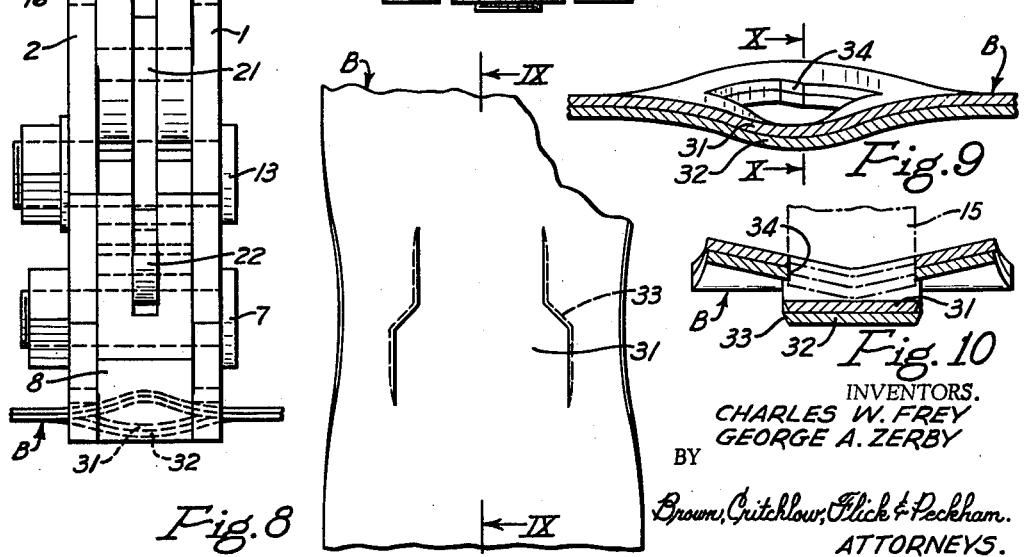

INVENTORS.
CHARLES W. FREY
GEORGE A. ZERBY
BY Brown, Critchlow, Flick & Peckham.
ATTORNEYS.

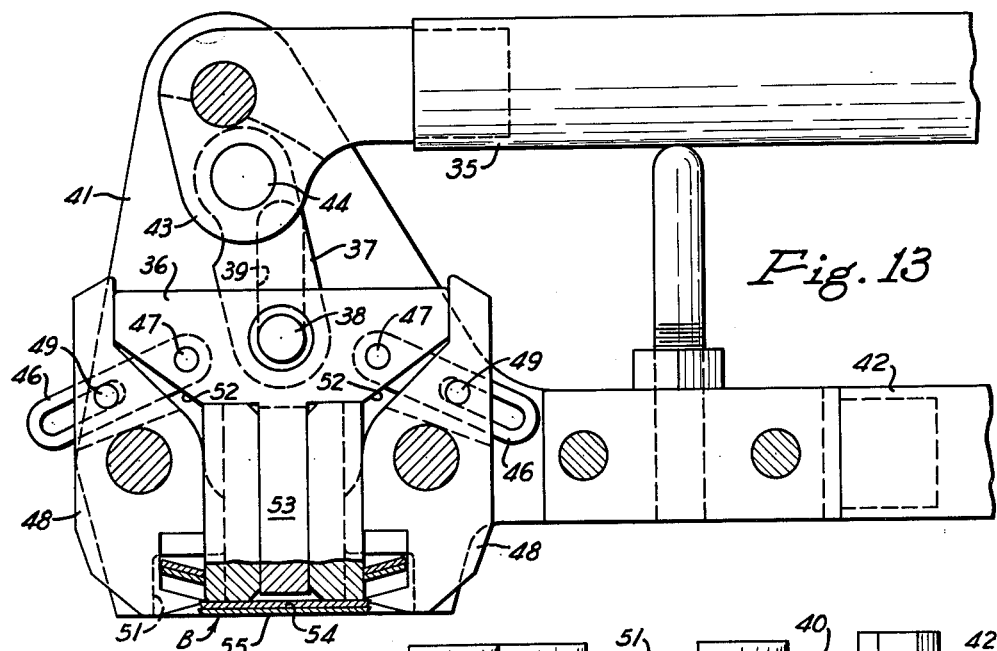
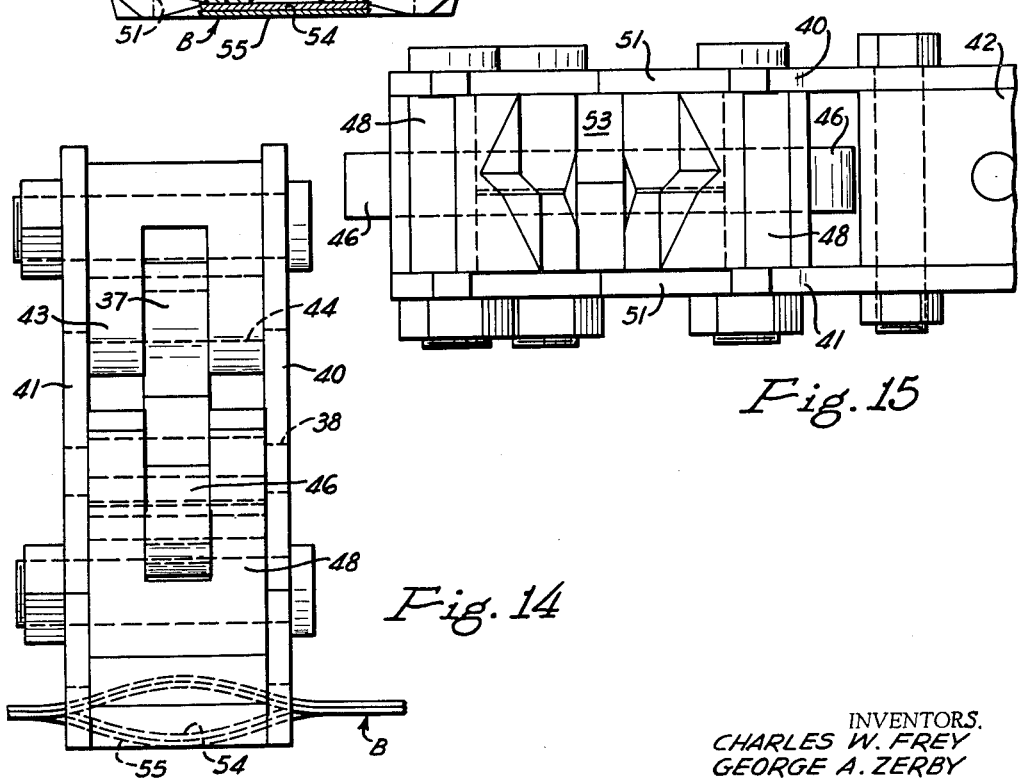

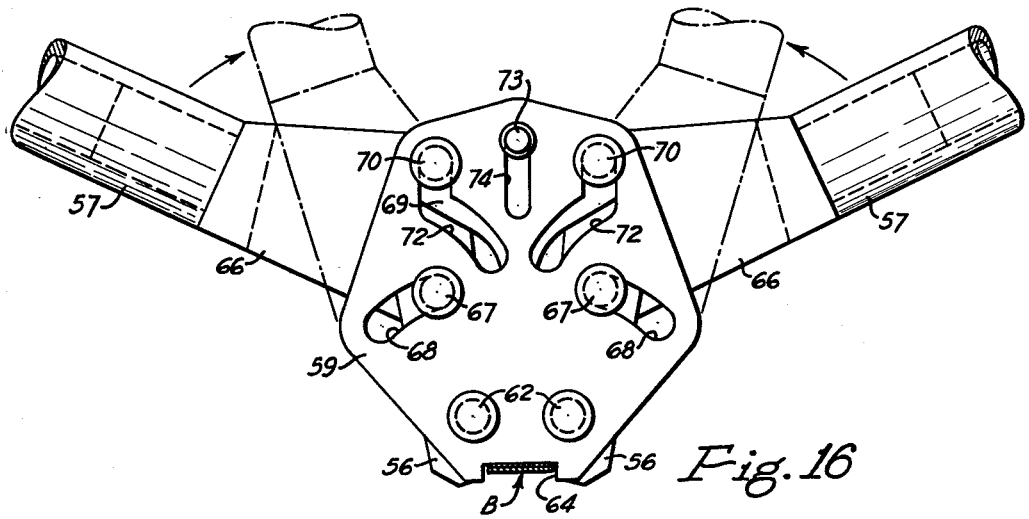
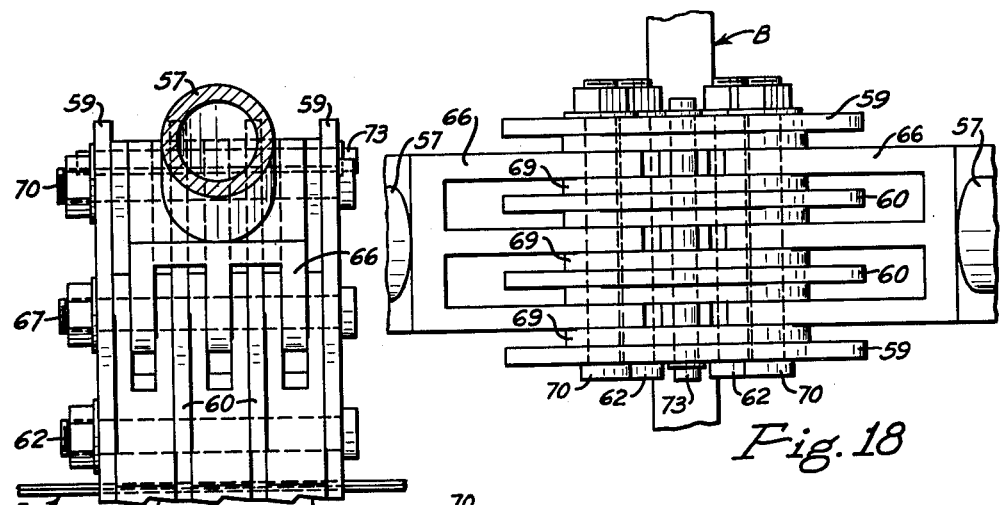
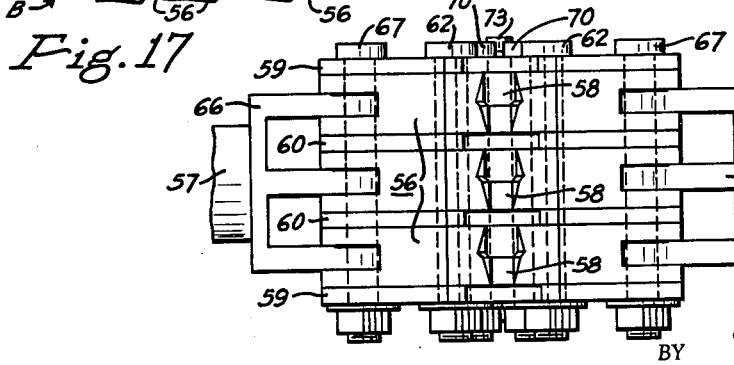

July 13, 1965  C. W. FREY ETAL  3,194,281

METHOD AND TOOL FOR LOCKING STRAPPING BAND ENDS TOGETHER

Filed Dec. 18, 1962  7 Sheets-Sheet 7

INVENTORS.
CHARLES W. FREY
GEORGE A. ZERBY
BY
Brown, Critchlow, Flick & Peckham.
ATTORNEYS.

United States Patent Office 3,194,281
Patented July 13, 1965

3,194,281
METHOD AND TOOL FOR LOCKING STRAPPING BAND ENDS TOGETHER
Charles W. Frey, Whitehall, Pa., and George A. Zerby, Cleveland, Ohio, assignors to Allegheny Steel Band Co., Pittsburgh, Pa., a corporation of Pennsylvania
Filed Dec. 18, 1962, Ser. No. 245,441
13 Claims. (Cl. 140—93.2)

This invention relates to the strapping of packages, bundles and the like with metal bands, and more particularly to doing so without the use of sealing members to lock the ends of the bands together.

A common way of industrially strapping a package or the like to hold it together is to wrap a metal band tightly around it and then fasten the ends of the band together by means of a separate metal clip that is clamped around them. Another method that has been used for many years to some extent, and which is becoming more popular, is to eliminate the use of the separate sealing clips by punching portions of the overlapping ends of the strapping band itself in such a manner that they are interlocked. One of the many patents showing a tool for such a purpose is number 2,040,576. That patent shows in FIG. 9 pairs of zig-zag slits that are cut in the overlapping ends of a strapping band by a punch in forming punched-out superimposed loops provided with central shoulders at their opposite edges. Very often the tendency of the bundle to expand or the tendency of a stretched band to contract pulls the ends of the band in opposite directions and thereby causes the shoulders of the loops at one end of the band to slide under the shoulders at the opposite sides of the openings left by the loops in the other end of the band to interlock the two ends of the band. However, relative movement of the ends of the band to interlock them does not always take place, and in other cases the strapped bundle may settle or become more compact so that tension on the band is removed and the previously locked ends become unlocked. In other words, such a band depends upon tension to pull the two sets of shoulders into overlapping locking engagement, and it also depends upon the continuance of that tension to maintain the engagement. If either condition does not exist, interlocking either does not occur or is impaired.

It is among the objects of this invention to provide a method and tool for locking the overlapping ends of a strapping band together without the use of seals, with which dependable locking is effected whether or not the band is put under tension.

In accordance with this invention, the overlapping ends of a strapping band that extends around a package or the like are first bowed transversely and then a pair of longitudinally extending superimposed loops are punched out of the bowed ends from the concave side of the band toward its convex side a distance far enough for one of the loops to project through the band opening left by the other loop. The loops are then flattened transversely to some extent so that the central portion of the projecting loop will become wider than the opening through which it extends. This prevents the projecting loop from moving back through the opening, so the ends of the band cannot come apart.

The invention is illustrated in the accompanying drawings, in which

FIG. 1 is a side view of a strapping tool incorporating this invention, the tool being shown in its open position;

FIG. 2 is an enlarged fragmentary plan view of the tool;

FIG. 3 is a side view of the tool shown in FIG. 2, but with the near side plate removed;

FIGS. 4 and 5 are views similar to FIG. 3 but showing the tool in further stages of its operation;

FIG. 6 is an end view of the closed tool shown in FIG. 5;

FIG. 7 is a fragmentary bottom view of the closed tool;

FIG. 8 is an enlarged fragmentary view looking down on band ends locked together by the tool;

FIG. 9 is a longitudinal section of the band, taken on the line IX—IX of FIG. 8;

FIG. 10 is a cross section of the band, taken on the line X—X of FIG. 9;

FIGS. 11 to 15 are views similar to FIGS. 3 to 7, respectively, showing a modified embodiment of the invention;

FIG. 16 is a fragmentary side view of another modification in open position;

FIG. 17 is an end view;

FIG. 18 is a plan view;

FIG. 19 is a bottom view but with the tool closed; and

Figure 11:
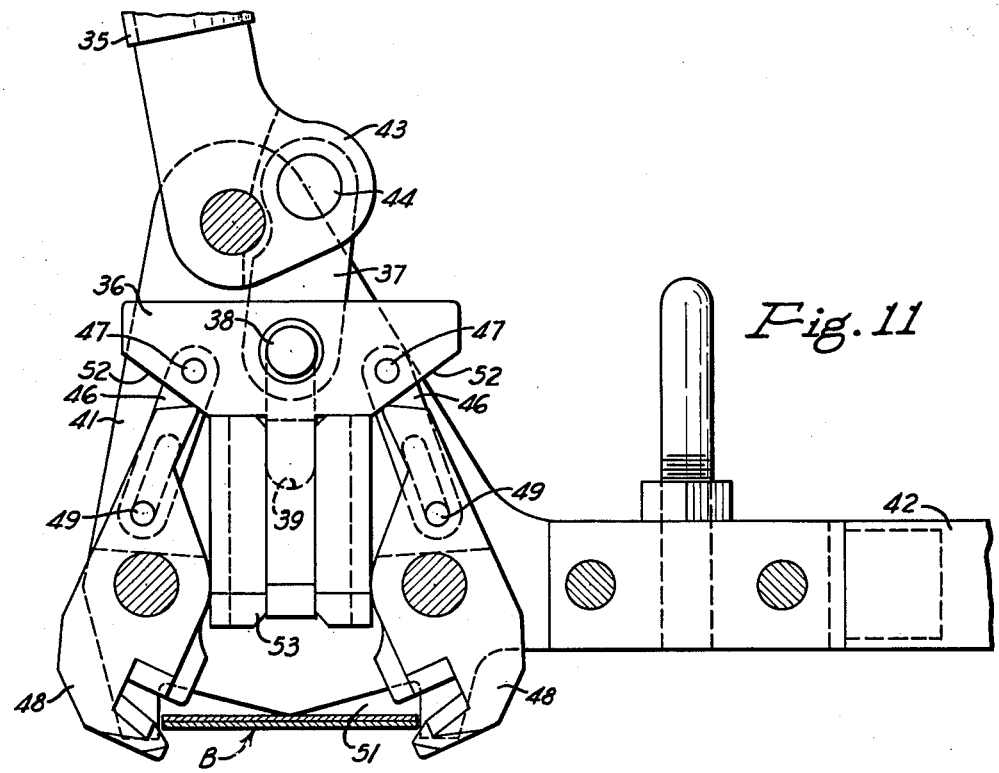

Referring to FIGS. 1 to 7 of the drawings, a pair of parallel side plates 1 and 2 are rigidly connected by bolts 3 to the opposite sides of one end of a handle 4 extending back away from the plates. The tool will be described in the position in which it frequently is used, with its handle horizontal and the side plates vertical, because the tool frequently is applied to the portion of a band on top of a bundle or package. The lower edges of the plates are provided with shallow vertical recesses 5 wide enough to receive the strapping band B, with which the tool is used. The upper wall of each recess has a downwardly projecting central portion 6 for engaging the band midway between its opposite edges.

At the same level as the bolts 3, a pair of laterally spaced pivot pins 7 extend through the side plates and across the space between them. Pivotally mounted on these pins are the central portions of a pair of spaced jaws 8, the outer or lower ends of which are provided with opposed notches 9. The lower walls of the notches are inclined downwardly toward each other. When the upper ends of the jaws are swung toward each other, the jaw notches are swung away from each other out past the sides of recesses 5 so that the tool can be placed astraddle of the band as shown in FIGS. 1 and 3.

The upper ends of the spread jaws are slidingly engaged by the downwardly converging curved surfaces 11 of a sliding cam 12, the upper end of which is mounted on a cross pin 13 that extends up through the top of the cam slightly and also projects into the vertical slots 14 in the side plates. The lower part of the cam is secured to or is integral with a punch 15 that extends down between the jaws toward their notched ends in sliding engagement with the jaws.

Engaging the exposed upper portion of cross pin 13 is a bifurcated rotatable cam 16 that extends laterally from a lever 17 having its inner end pivotally mounted on a pin 18 extending through the tops of the side plates forward of the cross pin. When the lever extends upward or substantially perpendicularly to the handle as shown in FIGS. 1 and 3, the rotatable cam is raised or retracted and a pin 19 through it is located in the upper end of a slot 20 in a link 21 that extends down out of the cam and has its lower end rotatably mounted on the central portion of the cross pin 13 in the sliding cam. The retracted rotatable cam and link therefore hold the sliding cam in its upper position. At the same time a pair of links 22, the upper ends of which extend into slots in the sliding cam and are mounted on pins 23 extending through it, extend down into the bifurcated upper ends of the jaws. Pins 24 mounted in the jaws extend through the lower ends of longitudinal slots 25 in the lower portions of the links to hold the upper ends of the jaws against the lower ends of cam surfaces 11.

Before using this tool, the metal band B is wrapped around the article to be strapped in a well-known manner and the end portions of the band are overlapped. While the band is held under the desired tension, lever 17 of the tool is swung up to its upper position to open the jaws, whereupon the recessed side plates 1 and 2 are placed over the overlapping portions of the band as shown in FIGS. 1 and 3. Then the lever is swung down toward handle 4, causing the rotatable cam 16 to force the sliding cam 12 downward, which in turn first spreads the upper ends of the jaws apart to cause jaw notches 9 to swing inward over the opposite edges of the band and carry them upward as shown in FIG. 4. Since the center of the band is prevented by projections 6, or by the lower end of the punch in the absence of those projections, from moving farther up in recesses 5, the band is bowed, or even bent, transversely so that its upper surface is concave and its lower surface convex. As the sliding cam continues to be moved down it enters between the now parallel upper ends of the jaws to positively hold those upper ends apart and then forces the punch down through the bowed ends of the band.

The lower end of the punch has front and rear cutting edges that engage the band along lines extending lengthwise of the band before it is engaged by any other part of the punch. Although the objects of this invention can be accomplished if these cutting edges of the punch are straight throughout their length, they preferably have parallel end portions different distances apart connected by inclined portions so that those edges have a zig-zag appearance as shown in FIG. 7. Also, the lower end of the punch is tapered in a vertical plane parallel to the jaw pivots as shown in dotted lines in FIG. 8, but preferably has substantially straight surfaces extending from front to back. The portions of the jaws below their notches 9 have cutting edges conforming to the cutting edges of the punch, and surfaces 26 (FIGS. 5 and 7) flaring downwardly away from those edges.

By the time the lever has been swung down into engagement with a stop post 30 projecting upward from the inner end of the handle 4 as shown in FIG. 5, the punch will have passed entirely through the overlapping ends of the band and, in doing so, it will have formed a pair of superimposed loops 31 and 32 extending lengthwise of the band. It also will have moved far enough to force the adjoining upper loop 31 down through the band opening left by the lower loop 32 in the underlying end portion of the band. As soon as the loops pass beneath the cutting edges of the jaws, the pressure of the punch against the opposite side edges of the loops will cause the loops to flatten transversely and thereby spread out slightly beneath the flaring surfaces 26 of the jaws as indicated in FIGS. 5, 8 and 10. By "flattened," it is not meant that the loops necessarily become straight across, but merely that they approach that condition and become wider than the openings from which they were punched. Due to the fact that the loops are punched out of a transversely bowed portion of the band and therefore are transversely bowed originally, as shown in dotted lines in FIG. 10, the vertical edges of the loops and band openings are inclined to the sloping upper and lower surfaces of the band. Consequently, when the loops are flattened transversely their upper surfaces become wider than their lower surfaces as well as wider than the bottom of the lower opening above them. This is true even if after removal of the tool the portion of the band previously gripped by it returns to its original flat condition, which is very unlikely to happen because the metal band is not resilient enough for that.

Since the upper loop 31 is wider than the band opening that it passed through, that loop cannot pass back through that opening and so the ends of the band are locked together without the use of a separate sealing clip. It will be seen that this type of interlock is independent of any tension on the band and will hold securely in the complete absence of tension. On the other hand, if the band is placed under tension it will slide the shoulders 33 at opposite sides of the upper loop under the corresponding shoulders 34 at opposite sides of the opening formed by the lower loop in the band, and the band ends will be even more tightly joined together.

Whereas, in the embodiment of the invention just described, the sliding cam 12 is forced down by a rotating cam 16 that is turned by lever 17, in the modification shown in FIGS. 11 to 15 a sliding cam 36 is moved toward the overlapping ends of a metal band B by means of a link 37 pivotally connecting the lever 35 and cam. The cam is made in two laterally spaced parts, between which the lower end of the link is disposed. It is pivotally mounted on a pin 38 extending through the center of the cam and into vertical slots 39 in the parallel side plates 40 and 41 that are attached to the handle 42. The upper end of the link extends into a bifurcated lateral projection 43 of the lever and is pivotally mounted on a pin 44 extending therethrough. When the lever is in its upper position as shown in FIG. 11, the link lifts the sliding cam to its upper or retracted position. This movement of the cam causes a pair of links 46, the upper ends of which are pivoted on pins 47 extending through the cam, to swing the upper ends of the pivoted jaws 48 toward each other because the slotted lower ends of the links extend into the bifurcated upper ends of the jaws and are mounted on pivot pins 49 therein.

Figure 12:
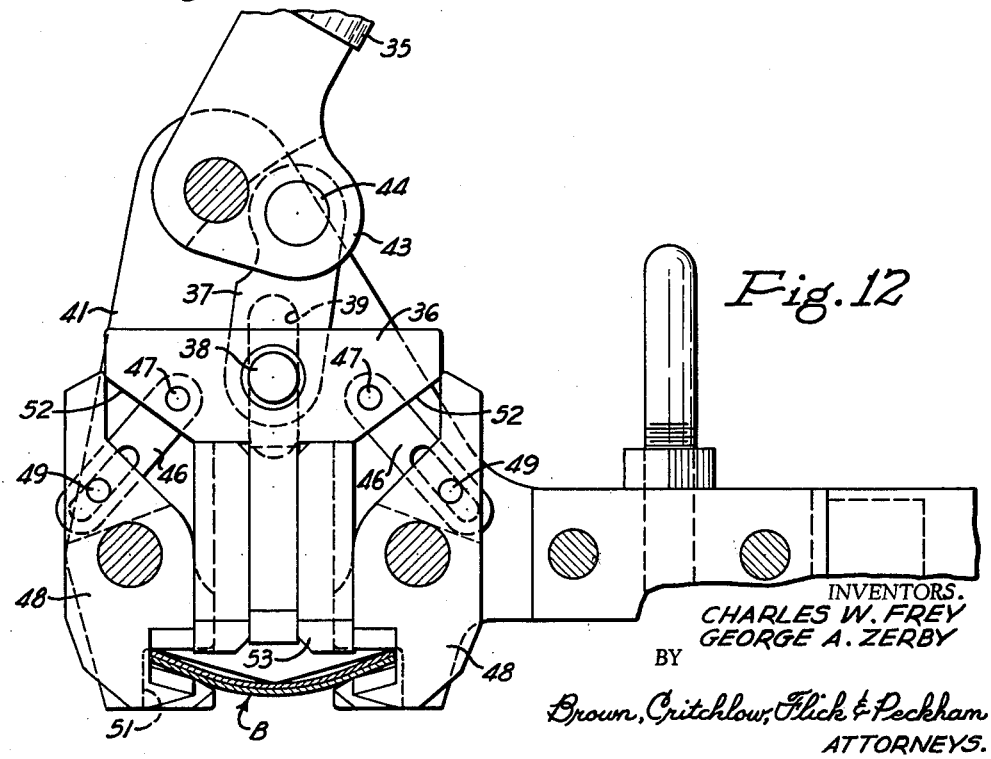

While the lower ends of the jaws are fully separated, recesses 51 in the bottoms of the side plates are fitted over the overlapping ends of the band. The upper walls of these recesses are tapered downwardly so that only their centers engage the center of the band. The lever 35 then is swung down toward the handle, which causes link 37 to force the cam downward, which in turn causes its inclined cam surfaces 52 to slide against the upper ends of the jaws to swing the latter outward. As the lower ends of the jaws are swung inward, as shown in FIG. 12, they bend the band upward around the central projections of the side plate recesses 51 to curve or bend the band transversely. Continual movement of the sliding cam downward forces a punch 53, attached to its bottom, down through the bowed band to cut longitudinally extending zig-zag slits through it in order to form superimposed loops 54 and 55 (FIG. 13) that extend lengthwise of the band. As soon as the upper loop clears the narrowest part of the opening between the closed jaws, the loops are flattened transversely by further movement of the punch so that they become wider than the band openings from which they were punched. This locks the ends of the band together in the manner shown in FIGS. 10 and 13. The lever then can be swung upward to retract the punch and sliding cam and to separate the jaws so that the tool can be removed from the band.

The modified tool shown in FIGS. 16 to 22 does the same thing as the two tools that have been described herein thus far, but the tool itself is different and it also shows that any of the tools can be formed for punching a row of loops in a strapping band. The specific tool illustrated is constructed for punching three pairs of superimposed loops in a line along the band, but it could be made to punch more or only a single pair of loops.

This tool has three pairs of pivoted jaws 56 disposed side by side, and two levers 57 that are operated in unison to swing the jaws and to force three punches 58 through the overlapping ends of a strapping band B. The tool includes two vertical side plates 59, between which there are two intermediate plates 60 of the same configuration. The intermediate plates separate the three pairs of jaws and the three punches. The jaws are pivotally mounted on pins 62 that extend through all four plates. The lower ends of the jaws are provided with opposed notches 63 which, when spaced their full distance apart, are at opposite sides of aligned band-receiving recesses 64 in the bottoms of the four plates.

The inner ends of the levers are provided with three-prong forks 66 that extend between the plates and into the bifurcated upper ends of the jaws. The lower corners of these forks are pivotally mounted in the upper ends of the jaws. Although a separate pivot pin could be used for the upper end of each jaw, better action is obtained if a single pin 67 extends through all of the jaws at each side of the tool. In such a case it is necessary to provide the plates with downwardly diverging arcuate slots 68 so that the two pins can be swung toward and away from each other with the jaws. The upper corners of the lever forks are pivoted to the wide heads 69 of the punches on a pair of laterally spaced pins 70 that extend through at least the intermediate plates 60 and preferably also through the side plates 59. The punch heads are provided with downwardly converging slots 71 that receive these pins, and the plates likewise are provided with pin-receiving slots 72. The plate slots 72 have parallel vertical upper portions that open into the upper ends of downwardly converging arcuate lower portions. To guide the punches in their vertical movements so that they will not be tilted by one lever or the other, a guide pin 73 extends through all of the punch heads and into central vertical slots 74 in the plates.

Figure 20:
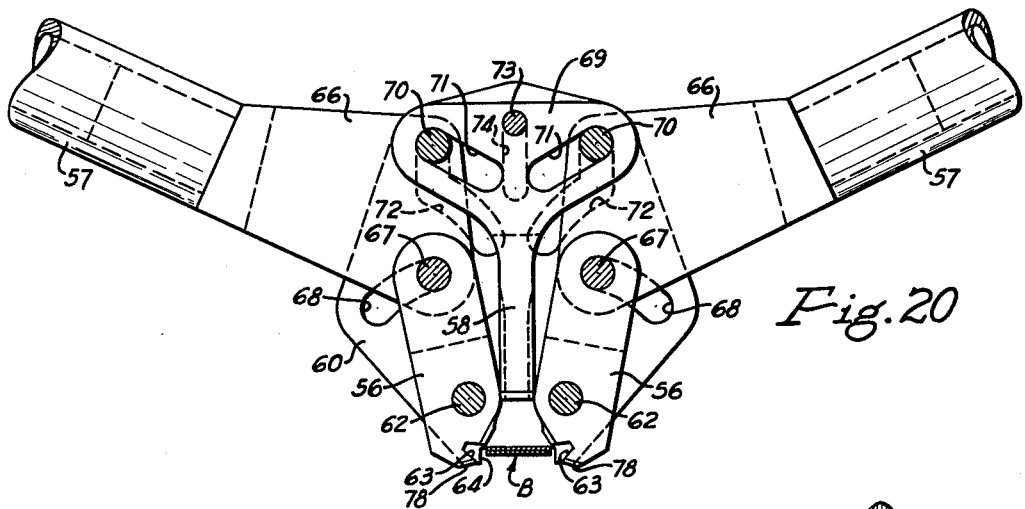
FIGS. 20 to 22 are views corresponding to FIGS. 3 to 5, respectively.

When the two levers are swung apart as far as they will go, as shown in FIGS. 16 and 20, the upper pivot pins 67 of the jaws are in the upper ends of their slots as shown in FIG. 20, pivot pins 70 that extend through the heads of the punches likewise are located in the upper ends of the punch slots 71 as well as in the upper ends of the upper plate slots 72. While the tool is in this condition it can be placed over the overlapping ends of the strapping band located in the bottom recesses 64 of the tool between the jaw notches. As the levers are swung toward each other they pivot on their upper pair of pins 70 and swing jaw pins 67 outward. This requires the upper pins to move downwardly in the vertical portions of the plate slots 72. As this is happening, the lower ends of the jaws are swung together to grip the opposite edges of the band and bow it transversely, the punch preventing upward bowing of the band.

Figure 21:
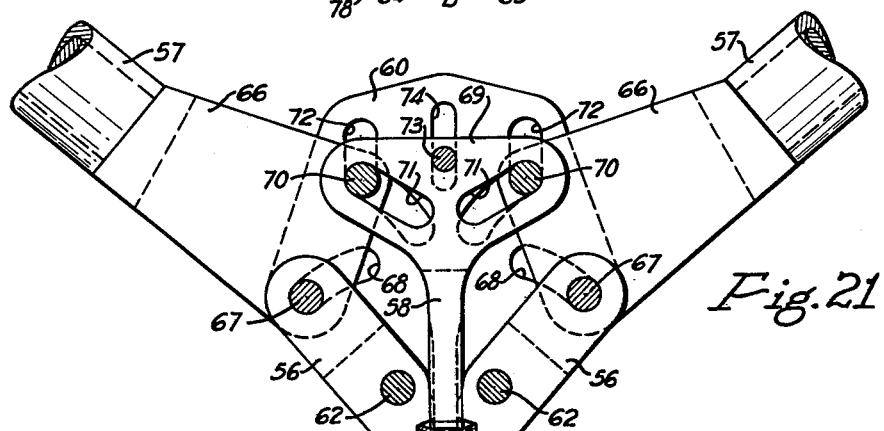
Figure 22:
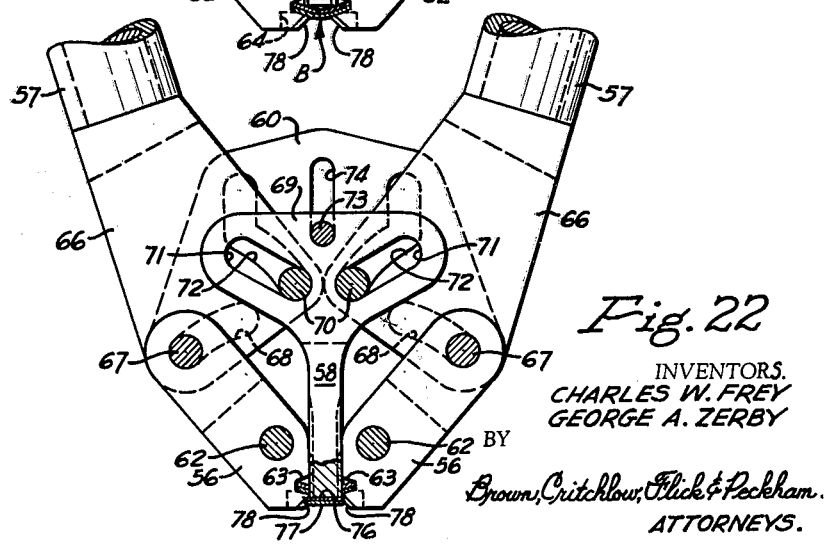

As shown in FIG. 21, by the time the upper jaw pivot pins reach the lower ends of their slots, the upper pins 70 have reached the junction of the vertical and inclined portions of the upper slots in the plates. Since the upper ends of the jaws can move no farther apart, continued movement of the levers toward each other causes them to pivot on jaw pins 67 and thereby swing pins 70 toward each other and downwardly in plate slots 72 and punch slots 71. This action forces the punches on down between the jaws and through the band to punch three pairs of superimposed loops 76 and 77 down out of the band. As soon as the edges of the loops reach the downwardly diverging lower surfaces 78 of the jaws, the punches flatten the loops transversely so that they cannot move back up through the band openings that were produced when they were formed. Of course, such a row of loops provides a better lock between the ends of the band than a single pair of loops would do.

After the strap ends have been interlocked in this manner, the levers are swung apart to first retract the punches and then separate the jaws from the band so that the tool can be removed from it. The movements at this time of the two sets of bodily movable pivot pins are just the reverse of their movements during the gripping and punching operations.

These tools also can be used for splicing the ends of separate bands together.

We claim:

1. The method of locking overlapping strapping band ends together, comprising squeezing the opposite edges of said overlapping ends toward each other to bow said ends transversely, punching a pair of longitudinally extending superimposed loops out of the bowed band ends from their concave toward their convex side far enough for one of the loops to project through the band opening formed by the other loop, flattening said loops transversely so that the central portion of said projecting loop will be wider than said opening, and releasing said edges of the band.

2. A strapping band locking tool comprising means for bowing the overlapping ends of such a band transversely, a punch, and means for forcing the punch through said bowed ends of the band from the concave side thereof, the punch being shaped to engage the band initially only along opposite edges of the punch extending lengthwise of the band to cut a pair of laterally spaced slits through the band in order to form a pair of longitudinally extending superimposed loops, said punch-forcing means being movable far enough to force the adjoining loop through the band opening left by the other loop and to flatten the loops.

3. A tool according to claim 2, in which the band-engaging end of said punch has substantially straight surfaces extending laterally thereof substantially at right angles to the path of movement of the punch.

4. A strapping band locking tool according to claim 2, in which said means include a sliding cam, a rotatable cam for actuating the sliding cam, and a pivoted lever for rotating the rotatable cam.

5. A strapping band locking tool according to claim 2, in which said bowing means includes a cam, and said punch forcing means includes a pivoted lever and a link pivotally connected to the lever and cam.

6. A strapping band locking tool comprising a pair of spaced jaws provided at one end with opposed notches adapted to receive the opposite edges of the overlapping ends of a strapping band, means pivotally supporting the jaws on parallel axes, means for swinging the jaws on their axes to move said notches toward each other to bow said overlapping ends transversely away from said pivoting means, a punch movable between the jaws toward and away from their notched ends, and means for forcing the punch through said bowed ends of the band from the concave side thereof, the punch being shaped to engage the band initially only along opposite edges of the punch extending lengthwise of the band to cut a pair of laterally spaced slits through the band in order to form a pair of longitudinally extending superimposed loops, said punch-forcing means being movable far enough to force the adjoining loop through the band opening left by the other loop and to flatten the loops.

7. A strapping band locking tool according to claim 6, in which said jaw-swinging means includes a sliding cam rigidly connected to said punch and slidably engaging the ends of the jaws opposite said notches, and said punch forcing means includes a rotatable cam engaging said sliding cam to move it toward said notches and a pivoted lever rigidly connected to said rotatable cam for turning it.

8. A strapping band locking tool according to claim 7, including longitudinally slotted pivoted links connecting said sliding cam with said jaws for swinging the jaws apart when the sliding cam is retracted, and a longitudinally slotted pivoted link connecting said cams for retracting the sliding cam when said rotatable cam is retracted by said lever.

9. A strapping band locking tool according to claim 6, in which said jaw-swinging means includes a sliding cam rigidly connected to said punch and slidably engaging the ends of the jaws opposite said notches, and said punch forcing means includes a pivoted lever and a link pivotally connecting the lever with said cam for reciprocating the cam.

10. A strapping band locking tool according to claim 6, including stationary means between said pivotal means engageable with the band only midway between its edges before the jaws are swung toward each other.

11. A strapping band locking tool according to claim 6, in which said jaw-swinging means includes a sliding cam rigidly connected to said punch and slidably engaging the ends of the jaws opposite said notches, and longitudinally slotted pivoted links connecting said cam with said jaws for swinging the jaws apart when the cam is retracted.

12. A strapping band locking tool comprising a pair of spaced jaws provided at one end with opposed notches adapted to receive the opposite edges of the overlapping ends of a strapping band, means pivotally supporting the jaws on parallel axes, a punch between the jaws movable forward toward their notched ends and having a wide head provided with a pair of forwardly converging slots, a pair of opposed levers, a pivot pin extending through each of said slots and connected to one end of a lever, a pivot pin connecting said end of each lever to the unnotched end of a jaw in front of said head, and guide plates at opposite sides of the jaws provided with slots slidingly receiving said first-mentioned pivot pins, the rear portions of the guide plate slots extending forward in substantially parallel relation and then converging forward, whereby the punch is moved forward as the levers are swung toward each other to cause the jaws to bow said band transversely.

13. A strapping band locking tool according to claim 12, in which said guide plates are provided with a pair of straight slots extending lengthwise of the punch midway between said plate slots, and a guide pin extends through the punch and into said straight slots for movement back and forth therein as the punch is reciprocated.

References Cited by the Examiner

UNITED STATES PATENTS

| | | | |
|---|---|---|---|
| 1,495,995 | 6/24 | Flora | 140—93.2 |
| 2,093,733 | 9/37 | Paxton et al. | 140—93 |
| 3,163,931 | 1/65 | Nielsen | 153—2 |

FOREIGN PATENTS

| | | |
|---|---|---|
| 671,083 | 1/39 | Germany. |
| 267,160 | 10/27 | Great Britain. |
| 329,596 | 6/58 | Switzerland. |

CHARLES W. LANHAM, *Primary Examiner.*